US012671251B2

(12) United States Patent
Hovila et al.

(10) Patent No.: US 12,671,251 B2
(45) Date of Patent: Jun. 30, 2026

(54) EVOLVING FAULTS IN A POWER GRID

(71) Applicant: ABB Schweiz AG, Baden (CH)

(72) Inventors: Petri Hovila, Vaasa (FI); Henry Niveri, Vaasa (FI)

(73) Assignee: ABB SCHWEIZ AG, Baden (CH)

( * ) Notice: Subject to any disclaimer, the term of this patent is extended or adjusted under 35 U.S.C. 154(b) by 759 days.

(21) Appl. No.: 17/932,443

(22) Filed: Sep. 15, 2022

(65) Prior Publication Data

US 2023/0089081 A1 Mar. 23, 2023

(30) Foreign Application Priority Data

Sep. 15, 2021 (EP) ..................................... 21196843

(51) Int. Cl.
H02J 3/00 (2026.01)
H02J 3/0012 (2026.01)
*H02J 103/30* (2026.01)

(52) U.S. Cl.
CPC ......... H02J 3/0012 (2020.01); *H02J 2103/30* (2026.01)

(58) Field of Classification Search
CPC .. H02J 3/0012; H02J 2203/20; G01R 31/088; G01R 31/085
See application file for complete search history.

(56) References Cited

U.S. PATENT DOCUMENTS

2013/0232094 A1* 9/2013 Anderson .......... G05B 23/0281
706/12
2014/0281645 A1* 9/2014 Sen ......................... H02J 3/003
713/340

2020/0201950 A1* 6/2020 Wang ...................... F03D 17/00
2020/0209841 A1* 7/2020 Srinivasan ........... G05B 23/024
2020/0333767 A1 10/2020 Engelstein et al.
(Continued)

FOREIGN PATENT DOCUMENTS

CN 108375715 A 8/2018

OTHER PUBLICATIONS

Wang, Xiaoyu, et al.; "A Data Analytic Approach to Automatic Fault Diagnosis and Prognosis for Distribution Automation"; IEEE Transactions on Smart Grid, vol. 9, No. 6; IEEE; United States; Nov. 1, 2018; 9 Pages.

(Continued)

*Primary Examiner* — Christopher W Carter
(74) *Attorney, Agent, or Firm* — Greenberg Traurig, LLP

(57) ABSTRACT

For detecting evolving faults in an electric power grid, a machine learning based model is trained and the trained model used using events with time information as input. An event is generated by a function in an intelligent electronic device based on one or more values measured from the electric power grid, the event indicating at least the function and its output. In the training, a plurality of event patterns that are extracted from event history data are used, an event pattern including in occurrence order events preceding within a time span a disturbance event. The disturbance event is an event resulting to an interruption in power supply in the electric power grid. The trained predictor is outputting predictions for occurrence times of disturbance events in the electric power grid, and they are displayed for detecting evolving faults in the electric power grid.

25 Claims, 4 Drawing Sheets

(56) References Cited

U.S. PATENT DOCUMENTS

2023/0036218 A1* 2/2023 Acton ................. G01R 31/088

OTHER PUBLICATIONS

Dabeeruddin, Syed, et al.; "Smart Grid Big Data Analytics: Survey of Technologies, Techniques, and Applications"; Journal and Magazines, IEEE Access, vol. 9; Nov. 27, 2020; 22 Pages.
Promrat, Witsanu, et al.; "Fault Cause Classification on PEA 33 kV Distribution System using Supervised Machine Learning compared to Artificial Neural Network"; 2021 9th International Electrical Engineering Congress (IEECON), IEEE; Pattaya, Thailand; Mar. 10, 2021; 4 Pages.
Valabhoju, Ashok, et al.; "Optimized ensemble of regression tree-based location of evolving faults in dual-circuit line"; Neural Computing and Applications, vol. 33, No. 14; Springer, London, England; Jan. 6, 2021; 26 Pages.
European Search Report; Application No. EP 21 19 6843; Issued: Feb. 16, 2022; 2 Pages.

* cited by examiner

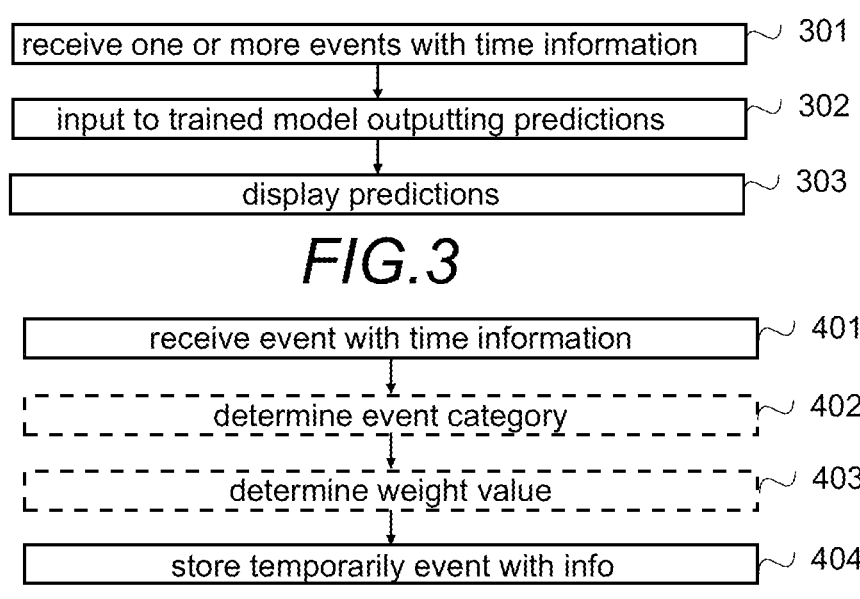

| receive one or more events with time information | 301 |
| input to trained model outputting predictions | 302 |
| display predictions | 303 |

FIG.3

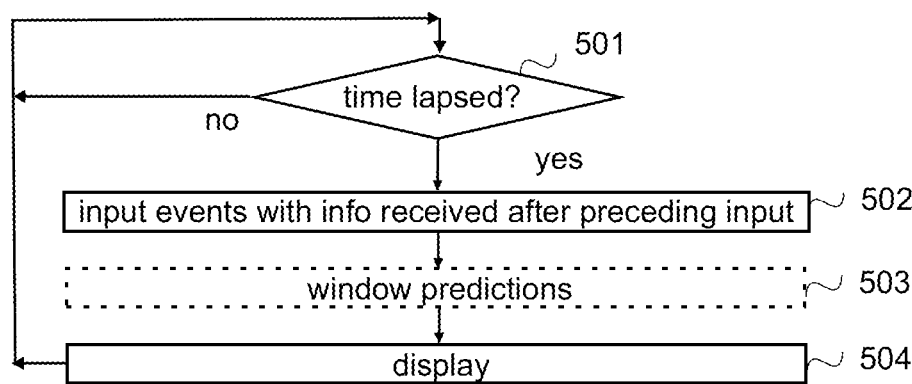

| receive event with time information | 401 |
| determine event category | 402 |
| determine weight value | 403 |
| store temporarily event with info | 404 |

FIG.4

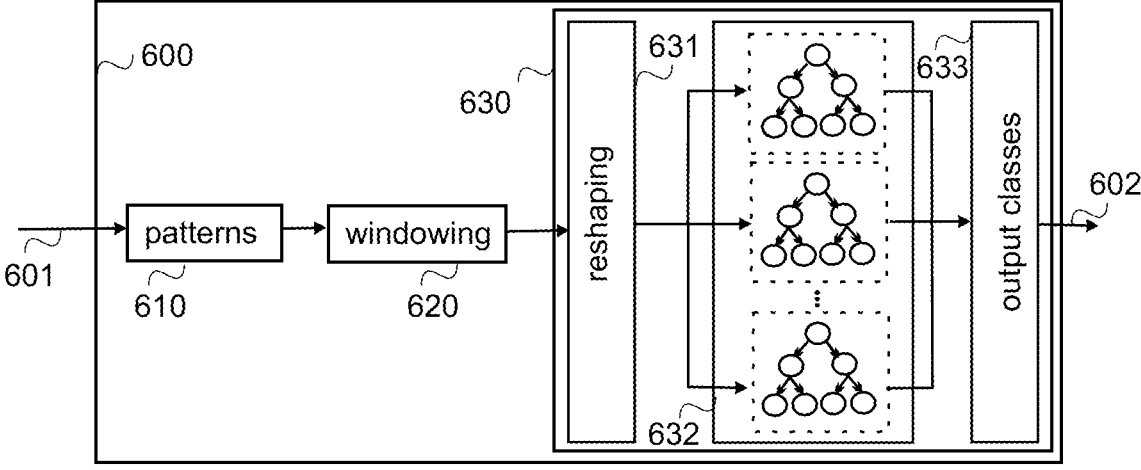

FIG.5

*(flowchart)*

501 time lapsed? — no / yes
502 input events with info received after preceding input
503 window predictions
504 display

FIG.6

600
601
610 patterns
620 windowing
630 reshaping
631
632
633
602
output classes

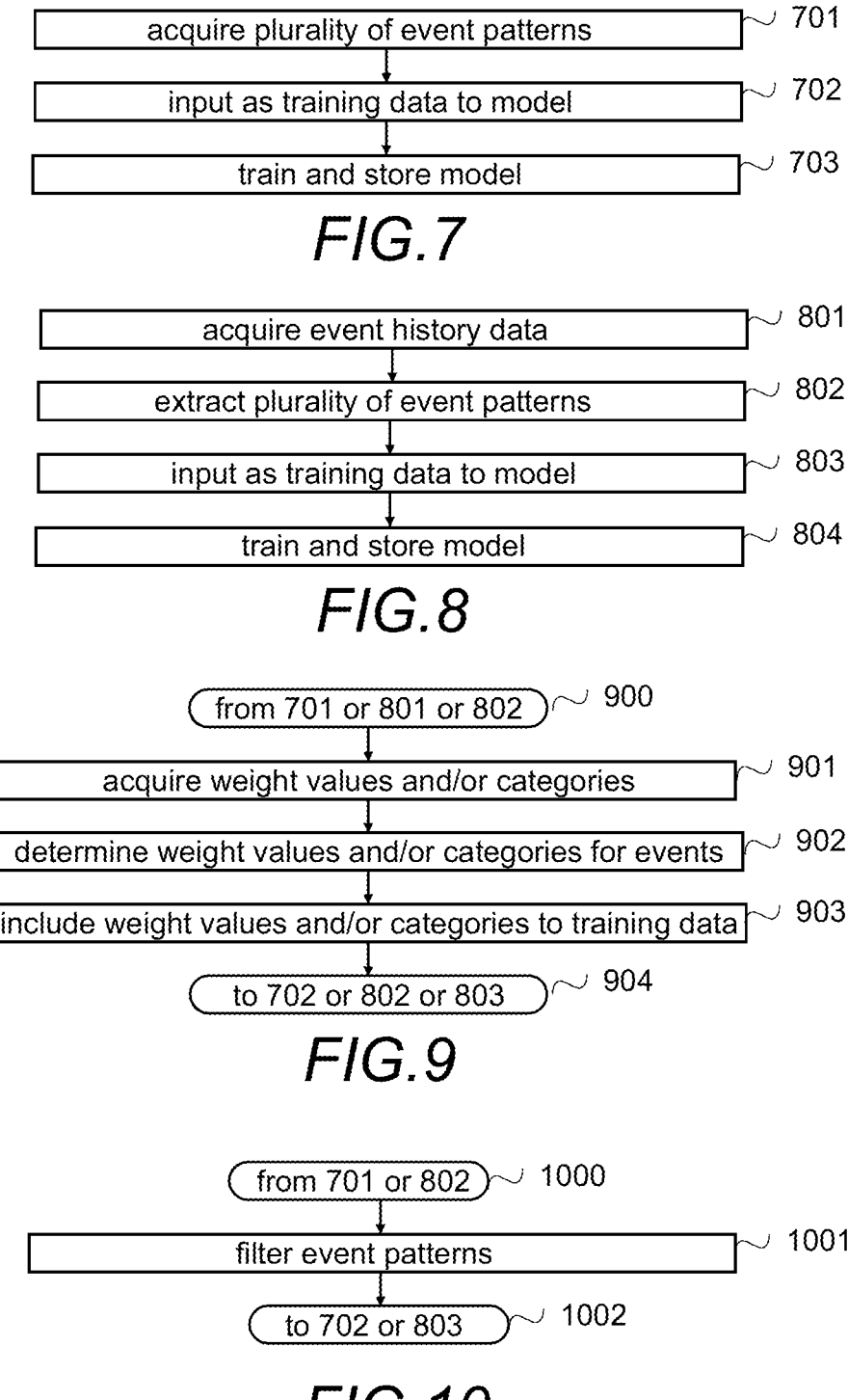

acquire plurality of event patterns — 701 input as training data to model — 702 train and store model — 703

*FIG.7* acquire event history data — 801 extract plurality of event patterns — 802 input as training data to model — 803 train and store model — 804

*FIG.8* from 701 or 801 or 802 — 900 acquire weight values and/or categories — 901 determine weight values and/or categories for events — 902 include weight values and/or categories to training data — 903 to 702 or 802 or 803 — 904

*FIG.9* from 701 or 802 — 1000 filter event patterns — 1001 to 702 or 803 — 1002

*FIG.10*

EVOLVING FAULTS IN A POWER GRID

TECHNICAL FIELD

The present invention relates to electric power grids.

BACKGROUND ART

The evolvement of networking between computers and measurement devices, especially different sensors, capable of communicating without user involvement, has increased the amount of data collected. Smart grids have been gradually replacing the traditional power distribution grids. Such transformation is linked to adding a large number of smart meters and other sources of information extraction units. The development of a smart grid is fully associated with the big data flow. A paper by Dabeeruddin Syed et al., "Smart Grid Big Data Analytics: Survey of Technologies, Techniques, and Applications", published in IEEE Access, vol. 9, pages 59564-59585, provides deep insights into various big data technologies, and discusses big data analytics in the context of the smart grid. The paper discloses that a prognostic maintenance, which utilizes condition-based maintenance, may be based on analysis of data from SCADA (supervisory control and data acquisition). However, data from SCADA is filtered data, and hence its use for detecting evolving faults is challenging.

SUMMARY

According to an aspect there is provided a computer implemented method for fault prediction for an electric power grid comprising intelligent electronic devices, the method comprising: receiving events with time information from one or more intelligent electronic devices, an event being generated by a function in an intelligent electronic device based on one or more values measured from the electric power grid, the event indicating at least the function and its output; inputting at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the trained predictor outputting predictions for occurrence times of disturbance events in the electric power grid; and displaying the predictions for detecting evolving faults in the electric power grid.

In an embodiment, the displaying the predictions as a function of time comprises: displaying two or more time windows of different lengths when determined from the same starting time; and indicating, per a displayed time window, whether an occurrence time of a disturbance event is within the time window, or within the next time window, or neither.

In an embodiment, the method further comprises: maintaining information associating events to event categories, wherein the information associates an event with one of the event categories; determining, before inputting the event, a category of the event; and inputting with the event also at least the category as input data to the trained predictor.

In an embodiment, the method further comprises: maintaining information associating events to weight values, wherein the information associates an event with one weight value; determining, before inputting the event, a weight value of the event; and inputting with the event also at least the weight value as input data to the trained predictor.

In an embodiment, the method further comprises: storing the events with time information at least temporarily; inputting with the event also at least the time information as input data to the trained predictor; and performing the inputting periodically.

According to an aspect there is provided a computer implemented method comprising: acquiring a plurality of event patterns extracted from event history data, or acquiring the event history data and extracting the plurality of event patterns from the history data, wherein the event history data comprises events with time information from one or more intelligent electronic devices, an event being generated by a function in an intelligent electronic device based on one or more values measured from the electric power grid, the event indicating at least the function and its output, and an event pattern comprising in occurrence order events preceding within a preset time span a disturbance event, which is an event resulting to an interruption in power supply in the electric power grid; inputting the plurality of event patterns as a training data to a machine learning model to train the model to predict occurrence times of disturbance events in the electric power grid; and storing the trained model to be used as a trained predictor for electric power grids.

In an embodiment, the machine learning model is a model outputting two or more time windows of different lengths, a length of a time window not exceeding the preset time span, the time windows predicting the occurrence times of disturbance events by being classified, per a time window, to one of three classes indicating, whether an occurrence time of a disturbance event is within the time window, or within the next time window, or neither.

In an embodiment, the method further comprises filtering, before inputting, from the plurality of event patterns, event patterns in which a disturbance event is generated by a function indicating testing or commissioning.

In an embodiment, an event pattern comprises events generated by protective functions or control functions.

In an embodiment, the method further comprises: acquiring information associating events to event categories, wherein the information associates an event with one of the event categories; determining, per an event pattern, before inputting, a category of an event for events in the event pattern; and including event categories to be part of the event pattern as the training data.

In an embodiment, the method further comprises: acquiring information associating events to weight values, wherein the information associates an event with one weight value; determining, before inputting, per an event pattern, a weight value of an event in the event pattern; and including weight values to be part of the event pattern as the training data.

In an embodiment, the method further comprises filtering from the event pattern events having a weight value under a preset threshold.

According to an aspect there is provided an apparatus comprising at least: a processor; memory coupled with the processor; and computer program code stored in the memory and operable, when executed by the processor, to cause the apparatus at least to: receive events with time information from one or more intelligent electronic devices comprised in an electric power grid, an event being generated by a function in an intelligent electronic device based on one or more values measured from the electric power grid, the event indicating at least the function and its output; input at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the trained predictor outputting predictions for occurrence times of disturbance events in the electric power grid; and display the predictions for detecting evolving faults in the electric power grid.

In an embodiment of the apparatus, the at least one memory and computer program code are configured to, with the at least one processor, cause the apparatus further at least to perform the displaying the predictions as a function of time by: displaying two or more time windows of different lengths when determined from the same starting time; and indicating, per a displayed time window, whether an occurrence time of a disturbance event is within the time window, or within the next time window, or neither.

In an embodiment of the apparatus, the at least one memory and computer program code are configured to, with the at least one processor, cause the apparatus further at least to: maintain information associating events to event categories, wherein the information associates an event with one of the event categories; determine, before inputting the event, a category of the event; and input with the event also at least the category as input data to the trained predictor.

In an embodiment of the apparatus, the at least one memory and computer program code are configured to, with the at least one processor, cause the apparatus further at least to: maintain information associating events to weight values, wherein the information associates an event with one weight value; determine, before inputting the event, a weight value of the event; and input with the event also at least the weight value as input data to the trained predictor.

In an embodiment of the apparatus, the at least one memory and computer program code are configured to, with the at least one processor, cause the apparatus further at least to: store the events with time information at least temporarily; input with the event also at least the time information as input data to the trained predictor; and perform inputting periodically.

According to an aspect there is provided an apparatus comprising at least: a processor; memory coupled with the processor; and computer program code stored in the memory and operable, when executed by the processor, to cause the apparatus at least to: acquire a plurality of event patterns extracted from event history data, or acquire the event history data and extracting the plurality of event patterns from the history data, wherein the event history data comprises events with time information from one or more intelligent electronic devices comprised in an electric power grid, an event being generated by a function in an intelligent electronic device based on one or more values measured from the electric power grid, the event indicating at least the function and its output, and an event pattern comprising in occurrence order events preceding within a preset time span a disturbance event, which is an event resulting to an interruption in power supply in the electric power grid; input the plurality of event patterns as a training data to a machine learning model to train the model to predict occurrence times of disturbance events in the electric power grid; and store the trained model to be used as a trained predictor for electric power grids.

In an embodiment of the apparatus, the machine learning model is a model outputting two or more time windows of different lengths, a length of a time window not exceeding the preset time span, the time windows predicting the occurrence times of disturbance events by being classified, per a time window, to one of three classes indicating, whether an occurrence time of a disturbance event is within the time window, or within the next time window, or neither.

In an embodiment of the apparatus, the at least one memory and computer program code are configured to, with the at least one processor, cause the apparatus further at least to: filter, before inputting, from the plurality of event patterns, event patterns in which a disturbance event is generated by a function indicating testing or commissioning.

In an embodiment of the apparatus, an event pattern comprises events generated by protective functions or control functions.

In an embodiment of the apparatus, the at least one memory and computer program code are configured to, with the at least one processor, cause the apparatus further at least to: acquire information associating events to event categories, wherein the information associates an event with one of the event categories; determine, per an event pattern, before inputting, a category of an event for events in the event pattern; and include event categories to be part of the event pattern as the training data.

In an embodiment of the apparatus, the at least one memory and computer program code are configured to, with the at least one processor, cause the apparatus further at least to: acquire information associating events to weight values, wherein the information associates an event with one weight value; determine, before inputting, per an event pattern, a weight value of an event in the event pattern; and include weight values to be part of the event pattern as the training data.

In an embodiment of the apparatus, the at least one memory and computer program code are configured to, with the at least one processor, cause the apparatus further at least to filter from the event pattern events having a weight value under a preset threshold.

According to an aspect there is provided a non-tangible computer readable medium comprising program instructions for causing a computing apparatus to carry out for fault prediction for an electric power grid comprising intelligent electronic devices at least one of a first functionality or a second functionality, wherein the first functionality comprises at least: inputting, when receiving events with time information from one or more intelligent electronic devices, an event being generated by a function in an intelligent electronic device based on one or more values measured from the electric power grid, the event indicating at least the function and its output, at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the trained predictor outputting predictions for occurrence times of disturbance events in the electric power grid; and displaying the predictions for detecting evolving faults in the electric power grid, wherein the second functionality comprises at least: acquiring a plurality of event patterns extracted from event history data, or acquiring the event history data and extracting the plurality of event patterns from the history data, wherein the event history data comprises events with time information from one or more intelligent electronic devices, an event being generated by a function in an intelligent electronic device based on one or more values measured from the electric power grid, the event indicating at least the function and its output, and an event pattern comprising in occurrence order events preceding within a preset time span a disturbance event, which is an event resulting to an interruption in power supply in the electric power grid; inputting the plurality of event patterns as a training data to a machine learning model to train the model to predict occurrence times of disturbance events in the electric power grid; and storing the trained model to be used as a trained predictor for electric power grids.

BRIEF DESCRIPTION OF THE DRAWINGS

In the following, exemplary embodiments will be described in greater detail with reference to accompanying drawings, in which
FIGS. 3 to 5 are flow chart illustrating examples of functionalities;
FIG. 6 schematically shows an example of information flow and a model to be trained;
FIGS. 7 to 11 are flow chart illustrating examples of functionalities relating to training.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments/examples to consist of only those features that have been mentioned and such embodiments may contain also features/structures that have not been specifically mentioned.

Different embodiments and examples are described below using single units, models, devices (equipment) and memory (data storage), without restricting the embodiments/examples to such a solution. Concepts called cloud computing and/or virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment.

Figures 1, 2:
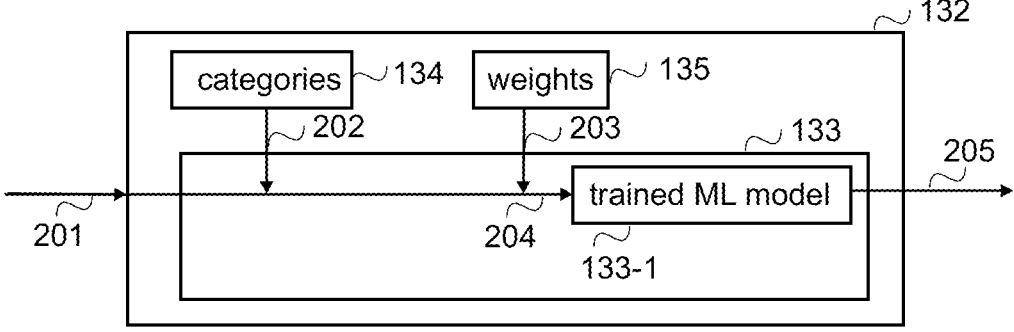
FIG. 1 shows a simplified architecture of a system.
FIG. 2 schematically shows an example of information flow.

A general simplified example of a system architecture is illustrated in FIG. 1, which only shows some devices, apparatuses and functional entities, all being logical units whose implementation and/or number may differ from what is shown. The connections shown in FIG. 1 are logical connections; the actual physical connections may be different. The connection(s) may be direct, wired connection(s), or short range wireless connection(s), such as Bluetooth, WLAN (wireless local area network), Li-Fi (light-fidelity), ZigBee and near field communication, just to name some examples without limiting to those, and/or the connection(s) may be over one or more networks, wired or wireless, including internet and cellular networks, such as 4G, 5G, and beyond, or any combination thereof. The details of the connections bear no significance and are therefore not described in detail herein. The system 100 may implement the Industrial Internet of Things (IIoT) to provide a mechanism for smart grid that may utilize cloud platform for remote monitoring, for example. However, any other implementation, including those not utilizing IIoT, may be used as well. Further, it is apparent to a person skilled in the art that the system comprises any number of shown elements, other devices/equipment and other functions that are not illustrated. They, as well as the protocols used for information transmission, for example, are well known by persons skilled in the art, details of which bear no significance to the invention. Therefore, they need not to be discussed in more detail here. It is obvious for one skilled in the art that any known or future connections and protocols may be used.

In the example illustrated in FIG. 1, the system 100 is a centralized system that comprises one or more power distribution grids 110, one or more control centers 130, one or more cloud platforms 102 and one or more offline equipments (apparatuses) 140.

The power distribution grid 110 depicts herein an electric power grid of any size. The power distribution grid 110 typically comprises a plurality of intelligent electronic devices (IEDs) 111, for example one per a circuit breaker or one per a group of circuit breakers or one per a substation. An intelligent electronic device (IED) is an electronic device that can be configured to comprise at least control functions, protective functions and monitoring functions. At least some of the functions use as inputs, i.e. react to, values measured from the electric power grid. The intelligent electronic device may measure values from the electric power grid and/or the intelligent electronic device may receive from one or more sensors, for example, values measured from the electric power grid. The functions generate, based on inputs they react, events. The intelligent electronic device 111 is configured to associate an event with time information, for example with a time stamp. The time information indicates occurrence time of the event. An event indicates at least the function and its output. The event may also indicate the intelligent electronic device and/or a device/sensor wherefrom the input originates. The intelligent electronic device 111 may be configured to send events to a control center 130, or to an intermediate device between the control center and the intelligent electronic device. The intelligent electronic device 111 may be configured to send events also to the cloud platform 102. However, since no amendments to the actual functioning of intelligent electronic devices 111, or to the functions based on which events are generated, or to the content of events, or event reports, are needed, there is no need to discuss them in more detail herein.

The cloud platform 102 (cloud environment) may be a public cloud, a community cloud, a private cloud, or a hybrid cloud, for example. In the illustrated example, the cloud platform 102 comprises at least a data storage 121 storing historic event data. The historic event data comprises events received and archived. In other words, the historic event data is an archive of event information, that exists also in prior art smart grids but that is not necessarily archived. The event data can be received directly from the intelligent electronic devices 111 and/or from a control center 130, for example. Following is an example extract of what the historic event data may comprise. It should be appreciated that it illustrates only a short time period, the historic event data comprises event data over a longer period. In the illustrated example one row corresponds to one event.

| time information | | indication of function and its output | |
|---|---|---|---|
| Mar. 9, 2021 | 15:40:03.378 | CBXCBR1 switch position | open |
| Mar. 9, 2021 | 15:39:53.447 | MAPGAPC1 OPERATE | true |
| Mar. 9, 2021 | 15:39:53.378 | CBXCBR1 switch position | closed |
| Mar. 9, 2021 | 15:39:33.478 | MAPGAPC1 OPERATE | true |
| Mar. 9, 2021 | 15:39:33.377 | MAPGAPC1 START | true |
| Mar. 9, 2021 | 15:39:33.377 | CBXCBR1 switch position | closed |
| Mar. 9, 2021 | 15:39:23.376 | CBXCBR1 switch position | open |
| Mar. 9, 2021 | 15:39:13.476 | MAPGAPC1 OPERATE | true |
| Mar. 9, 2021 | 15:39:13.377 | DCSXSWI2 switch position | closed |

As can be seen, events may be generated by different functions (function blocks or function instances) even at the same time. The historic event data may comprise, per an event, also other information, such as information indicating an electronic device, or instance (function block) in the electronic device wherein the event was created, and/or weather information and/or information on an event type, the event type indicating result of the function output, and/or information indicating whether the event occurred during testing or during commissioning or during power supply, etc., for example. A non-limiting example of event types include "Alm" for alarm, "Str" for start, "Op" for operate or trip, "SucRec" for successful reclosure and "UnsRec" for unsuccessful reclosure.

It should be appreciated that the historic event data may be maintained per a bay, per a substation, per a station, per an intelligent electronic device, etc.

The data storage 121, depicting one or more data storages, may be any kind of conventional or future data repository, including distributed and centralized storing of data, managed by any suitable management system. In the illustrated example of FIG. 1, the data storage 121 illustrates distributed storing in a cloud-based storage. Cloud storage services may be accessed through a co-located cloud computer service, a web service application programming interface (API) or by applications that utilize API, such as a cloud storage gateway or Web-based content management systems. In other words, a data storage 121 may be a computing equipment, equipped with one or more memories, or a sub-system, or an online archiving system, the sub-system or the system comprising computing devices that are configured to appear as one logical data storage for devices (equipment, apparatuses) that store data thereto and/or retrieve data therefrom. However, the implementation of the data storage 121 the manner how data is stored, retrieved and updated, i.e. details how the data storage is interfaced, and the location where the data is stored are irrelevant to the invention, and therefore not discussed in more detail herein. It is obvious for one skilled in the art that any known or future solution may be used.

A control center 130 depicts herein a remote site that comprises one or more computing apparatuses (devices) 132 for remote monitoring and/or controlling at least portion of the electric power grid. A computing apparatus 132 comprises, or is connected to, one or more user interfaces (UI) 131 for user interaction. In the illustrated example, at least one computing apparatus 132 comprises a predictor unit 133. The predictor unit 133 is a trained machine learning based model, which will be described in more detail below. The predictor unit 133 outputs predictions for occurrence times of disturbance events. A disturbance event is an event resulting to an interruption in power supply. Tripping is one example of an interruption. A disturbance events may be defined more precisely, for example as an event generated by function CBCSWI with output open, if said event happens within 2 seconds after an event generated by any function that has operated with output true. The predictions may be displayed via one or more user interfaces for detecting evolving faults. Evolving faults may be caused by a gradually falling tree to a power line, for example because of a storm, or a wear of cables, just to mention couple of examples. In the example illustrated in FIG. 1, the predictions are displayed 131-1 as a probability of occurrence using time windows of different length, when the length is determined from the same starting time. In the illustrated example the time window lengths are 1 hour, 6 hours, 1 day and 7 days, and the fill color in a time window column indicates whether the predicted occurrence is within the time window, within the next time window or neither. Hence, a user, regardless of his/her abilities, can easily see that there is an evolving fault. When an evolving fault is detected, preventive measures may be taken, either by the user or the computing apparatus. However, it should be appreciated that any other way to display the predictions may be used. For example, the predictions may be displayed as a probability in relation to time. Further, the predictions may be displayed, for example, per a bay and/or per a station and/or per a portion of the electric power grid, and/or for the whole electric power grid. In addition to displaying the predictions, warnings for evolving faults can be sent from the computing apparatus, or from the predictor unit to SCADA (supervisory control and data acquisition) and/or to a distribution management system and/or to other corresponding monitoring interfaces.

It should be appreciated that the intelligent electronic device 111, or a substation, or a station, may comprise a predictor unit with a corresponding user interface displaying the predictions.

Further, the computing apparatus 132 may be configured to perform also one or more other tasks, for example monitoring relating tasks. However, they bear no significance to disclosed solutions, and therefore they are not described in more detail herein.

In the illustrated example of FIG. 1, the offline equipment (apparatus) 140 comprises at least a trainer unit 116 configured to train at least the predictor unit 133 as will be described in more detail below. It should be appreciated that the offline equipment 140 may be part of the control center 130, or the cloud platform 102.

FIG. 2 shows an example of an information flow within an apparatus 132 comprising the predictor unit 133, the predictor unit providing real-time predictions. It should be appreciated that similar information flow may be used also with almost real-time predictions, which are predictions computed at certain time intervals, as will be explained with FIGS. 4 and 5.

Referring to FIG. 2, the predictor unit receives first input data 201. The first input data comprises at least an event with time information. The input data may comprise also other information, such as whether information. In the illustrated example of FIG. 2, the apparatus 132 comprises in its memory information 134 associating events to event categories, an event with one event category, and information 135 associating events to weight values, an event with one weight value. Preferably all possible events that may be generated are associated, per an event, with a category in the information 134 and with a weight value in the information 135. The weight value indicates an effect on, or an impact to, or magnitude of the impact to, the fault prediction. A non-limiting list of examples of event categories 134 include "autorecloser", "earth fault", "short circuit", "supervision", "unbalance or broken element", and "power quality". A non-limiting list of examples of weight values 135 include values 0, 1, 2, 3 and 4. The bigger the value, the faster a fault is likely to evolve, 0 meaning no likelihood on an evolving fault.

In the example of FIG. 2, the predictor unit 133 associates the event in the first input data with the event's category (202) and with the event's weight value (203), and inputs (204) to a trained machine learning (ML) based model 133-1 the first input data with the category and the weight value. The trained machine learning based model 133-1 outputs one or more predictions 205 for occurrence times of disturbance events.

FIGS. 3 to 5 are flow chart illustrating different functionalities of an apparatus comprising the predictor unit.

Referring to FIG. 3, when one or more events with time information, possibly also with other information, are received in step 301, the received information is input in step 302 to a trained machine learning based model, which outputs one or more predictions for occurrence times of disturbance events. Then the one or more predictions are displayed in step 303, either as outputted, or the output may be processed to be according to preset display definitions, examples of which are given with FIG. 1, so that the viewer of the display can detect evolving faults. For example, if the prediction is that a disturbance event will occur after 168 hours 15 minutes with an accuracy of 5 hours, the output may be processed, for example windowed, to display what is shown in FIG. 1 in the display 131-1.

In other implementations, a received event may be associated with a category and/or with a weight value, as described with FIG. 2.

FIGS. 4 and 5 discloses an implementation providing a near real time predictions. The processes described in FIGS. 4 and 5 may run in parallel.

Referring to FIG. 4, when an event with time information, possibly also with other information, is received in step 401, an event category for the event may be determined in step 402, as described with FIG. 2, and/or a weight value for the event may be determined in step 403, as described with FIG. 2. Then the event is temporarily stored in step 404, for example to a buffer, with related information, comprising at least the time information, and depending on an implementation, the related information may comprise the received other information, the category and/or the weight value. The temporarily stored events with related information are input periodically (at regular intervals of time) to the trained machine learning based model.

Referring to FIG. 5, it is monitored in step 501, whether a preset time (time interval) after previous input has lapsed. The time interval may be freely preset. It may be 5 seconds or one hour, for example.

If the preset time has lapsed (step 501: yes), those events that have been received after the previous input, i.e. preceding input, with related information are input in step 502 to the trained machine learning based model. In other words, the temporarily stored events with related information are input in step 502, the input causing that they are not any more temporarily stored. For example, the buffer is emptied. In the illustrated example it is assumed, that the predictions should be displayed as shown in FIG. 1 in the display 131-1. Therefore, depending on what the trained machine learning based model outputs, the output predictions may be windowed in step 503, and then displayed 504 so that the viewer of the display can detect evolving faults.

Use of event data as input data, as described above, ensures that relevant data, or at least most of the relevant data is used. Thanks to that, detecting evolving faults is a straightforward process, especially when compared to solutions using data from SCADA, since SCADA filters most of the relevant data away.

FIG. 6 shows an example of an information flow relating to training a machine learning based model and an example of a machine learning based model outputting occurrence times of disturbance events. More precisely, it describes an example of how the trainer unit, or an apparatus 600 comprising the trainer unit, operates to train one or more trainable algorithms for the predictor unit. A wide range of such algorithms, for example XGBoost algorithms and random forest algorithms, are available and any of them, or any corresponding future algorithms may be used as a basis for the trained model. In other words, the machine learning may be classification, using an artificial neural network, or a support vector machine, or regression, or their combination, to name couple of examples. Naturally, any other machine learning, such as image learning, rule-based learning and explanation-based learning, may be used.

The example in FIG. 6 describes basic principles used to create, train and retrain, when need arises, the predictor unit, without restricting solutions to the specific example. In the example of FIG. 6 it is assumed that there is enough historical event data for training, and if supervised learning is used, enough data which can be split to be used as training data and validation data, or test data, to create/update the trained model. Further, in the illustrated example of FIG. 6 it is assumed that the model is a classifier classifying preset time windows within a predefined time span to one of three classes.

Referring to FIG. 6, acquiring 601 a plurality of event patterns 610 extracted from the event history data, or acquiring the event history data 601 and extracting 610 the plurality of event patterns from the history data is performed. An event pattern comprises in occurrence order events preceding within the preset time span a disturbance event. In other words, the event patterns may be extracted from the event history data manually, or using extraction algorithms. For example, Word2Vec, which is a shallow neural network that outputs a vector for each event, may be used with a predefined anchor events, for example events created by one or more functions, to create a similarity measure of events causing disturbances. Another example is an algorithm called term frequency-inverse document frequency, which measures importance of events. When the windowing is used, an importance value is high if the event occurs often in only certain time windows and the importance value is low if an event occurs in most time windows or occurs very rarely, for example. Further, it should be appreciated that event patterns may be extracted per one or more bays, per one or more substations, etc.

Then windowing 620 is performed to the event patterns after they are extracted, or simultaneously when the event patterns are extracted. When the event patterns are extracted manually, the windowing may be performed automatically or manually. When the event patterns are extracted automatically, the windowing is performed automatically within the time span. During windowing the event patterns are grouped into time windows to have the resolution of the prediction and classification. Alternatively, in the windowing, from the event patterns, further event patterns are formed per a preset time window, wherein a further event pattern comprises events preceding the disturbance events within one of the preset time windows. For example, the time span could be 7 days, and preset time windows 1 hour, 4 hours, 12 hours, 1 day, 4 days, 7 days.

After windowing the event patterns (further event patterns) are input to the machine learning based model 630 for the predictor unit. In the illustrated example the machine learning model comprises an input layer 631, a class prediction layer 632 and an output layer 633. The model 630 may be an XGBoost model, in which event patterns are reshaped in the input layer by applying a feature vector to inputted event patterns, the class prediction layer predicting a class using the XGBoost algorithm, which uses a tree structure, the number of tree structures being a parameter that can be set. The output layer will get and output class predictable by class prediction layer, for example for each time window whether it is classified to one of the tree classes comprising, for example, "disturbance will happen within the time window", "disturbance will happen within next time window" and "neither" or "no disturbances". It should be appreciated that there may be two classes, or four or more classes used in the classification. The accuracy of the model may be evaluated, as is known by one skilled in the art.

If the event patterns are defined manually, the feature vector may be one hot encoding. If the event patterns are defined using Word2Vec, the feature vector may be minimum, maximum and mean distances of events in the window. If the event patterns are defined using the term frequency-inverse document frequency, the feature vector may be a weighted one-hot encoding.

At the beginning of the training, parameter values may be set or default parameter values may be used. For example, for the XGBoost algorithm default parameter values may be used.

When the training ends, a predictor unit is ready to be used. Depending on an implementation, once created trained model may be re-trained/updated periodically, in response to an explicit command, or continuously, using the principle disclosed above.

FIGS. 7 to 11 are flow charts illustrating different training related functionalities the trainer unit, or apparatus comprising the trainer unit, may perform when training the machine learning based model.

Referring to FIG. 7, a plurality of event patterns are acquired in step 701. Examples of event patterns are described above with FIG. 6. Depending on an implementation, the event patterns may be event patterns with the same time span, or event patterns with different time windows, a length of a time window being smaller than or equal to the time span. The acquired event patterns, or at least the part of event patterns intended for training, are then inputted in step 702 as a training data to a machine learning based model, which is trained in step 703 to be a trained model, and the trained model is stored in step 703, to be downloaded to a predictor unit, for example.

Referring to FIG. 8, event history data is acquired in step 801 and a plurality of event patterns are extracted in step 802. Examples of event patterns are described above with FIG. 6. Depending on an implementation, the event patterns may be event patterns with the same time span, or event patterns with different time windows, a length of a time window being smaller than or equal to the time span. The extracted event patterns, or at least the part of event patterns intended for training, are then inputted in step 803 as a training data to a machine learning based model, which is trained in step 804 to be a trained model, and the trained model is stored in step 804, to be downloaded to a predictor unit, for example.

FIG. 9 illustrates a functionality that may be performed (step 900) after acquiring event patterns (step 701 in FIG. 7), or after acquiring event history data (step 801 in FIG. 8), or after extracting event patterns (step 802 in FIG. 8) but before the next step illustrated in FIG. 7 or 8. Referring to FIG. 9, information associating events to weight values and/or information associating events to event categories, as described above, for example with FIG. 2, is acquired in step 901. Then for the events, per an event, weight values and/or event categories are determined in step 902, and the determined weight values and/or event categories are included in step 903 to be part of the training data. Then the process continues (step 904) to the next step, i.e. to step 702 in FIG. 7, or to step 802 in FIG. 8, or to step 803 in FIG. 8. It should be appreciated that event categories and/or the weight values may be used as inputs to a trained model that has been trained without corresponding input/inputs, and vice versa a model may be trained using the event categories and/or the weight values without corresponding input/inputs to the trained model.

FIG. 10 illustrates a functionality that may be performed (step 1000) after acquiring event patterns (step 701 in FIG. 7), or after extracting event patterns (step 802 in FIG. 8).

Referring to FIG. 10, once the event patterns are acquired or extracted (step 1000), event patterns that are not relevant are filtered in step 1001. Such an event pattern may be an event pattern in which a disturbance event is generated by a function indicating testing or commissioning. Another example includes that all other event patterns than those in which a disturbance event is generated by a control function and/or by a protection function are not relevant event patterns and hence are filtered away in step 1001. In other words, one or more filtering rules may be applied to event patterns. Then the process continues (step 1002) to input event patterns as the training data to the model to be trained, i.e. the process continues to step 702 in FIG. 7, or to step 803 in FIG. 8.

It should be appreciated that if the process includes also the functionality illustrated in FIG. 9, the functionality illustrated in FIG. 10 may be performed before or after the functionality illustrated in FIG. 9, so that both functionalities are performed before event patterns are inputted to the model to be trained.

Figure 11:
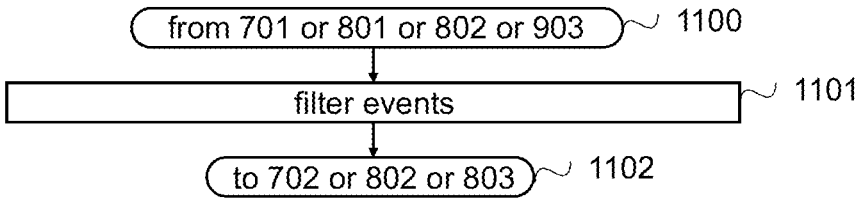

FIG. 11 illustrates a functionality that may be performed (step 1100) after acquiring event patterns (step 701 in FIG. 7), or after acquiring event history data (step 801 in FIG. 8), or after extracting event patterns (step 802 in FIG. 8) or after the determined weight values and/or event categories are included in step 903 to be part of the training data, but before the next step illustrated in FIG. 7 or 8 (next step in FIG. 9 refers to FIG. 7 or 8).

Referring to FIG. 11, events that are not relevant or are redundant are filtered in step 1101. In other words, one or more filtering rules may be applied to events. For example, an event that is not generated by a protective function or by a control function may be filtered away in step 1101, the result being that at the end the event patterns comprise events generated by control functions and by protective functions. If weight values are determined for events, events with a weight value below a preset threshold may be filtered away. For example, if weight values are 0 to 4, events with weight values below 2 may be filtered away from the training data. If event categories are determined for events, event categories may be used for filtering not relevant events away from the training data.

It should be appreciated that if the process includes also the functionality illustrated in FIG. 10, the functionality illustrated in FIG. 11 may be performed before or after the functionality illustrated in FIG. 10.

The training described above is offline training that may be performed by a dedicated training apparatus or a trainer unit comprised in an apparatus. However, at least when taken into use, the trained model may be updated by performing online training, for example by a separate trainer unit in the apparatus comprising the predictor unit or by the predictor unit in the apparatus, or in a server in a control center or in a remote service center.

The steps and related functions described above in FIGS. 2 to 11 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. For example, when no buffering is used, events may be inputted without time information to the predictor unit, which may use as the occurrence time of the event, the input time.

The techniques described herein may be implemented by various means so that an apparatus implementing one or more functions/operations described above with an embodiment/example, for example by means of any of FIGS. 1 to 11 and any combination thereof, comprises not only prior art means, but also means for implementing the one or more functions/operations of a corresponding functionality described with an embodiment, for example by means of any of FIGS. 1 to 11 and any combination thereof, and it may comprise separate means for each separate function/operation, or means may be configured to perform two or more functions/operations. For example, one or more of the means and/or the predictor unit, and/or the trainer unit, or any corresponding unit/subunit(s)/integrated unit comprising at least one of the units, for one or more functions/operations described above may be software and/or software-hardware and/or hardware and/or firmware components (recorded indelibly on a medium such as readonly-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 12:
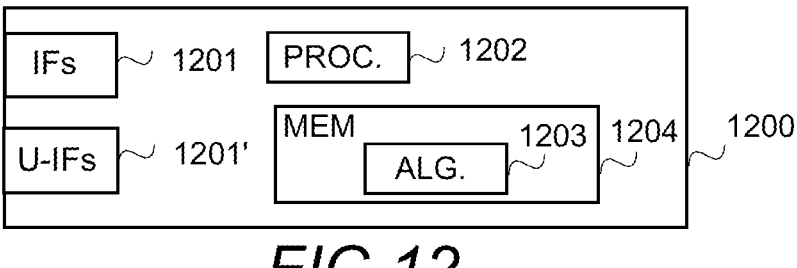
FIG. 12 is a schematic block diagram.

FIG. 12 is a simplified block diagram illustrating some units for an apparatus 1200 comprising the predictor unit and/or the trainer unit, or any corresponding unit/subunit(s)/integrated unit comprising at least both units, or configured otherwise to perform at least some functionality described above, for example by means of any of FIGS. 1 to 11 and any combination thereof, or some of the functionalities if functionalities are distributed in the future. In the illustrated example, the apparatus comprises one or more interface (IF) entities 1201, such as one or more user interfaces and one or more communication interfaces, one or more processing entities 1202 connected to various interface entities 1201, including different user interface entities 1201', and to one or more memories 1204.

The one or more interface entities 1201, including user interface entities 1201', are entities for receiving and transmitting information, such as communication interfaces comprising hardware and/or software for realizing communication connectivity according to one or more communication protocols, or for realizing data storing and fetching (obtaining, retrieving), or for providing user interaction via one or more user interfaces. The one or more user interfaces may be any kind of a user interface, for example a screen, a keypad, or an integrated display device or external display device.

A processing entity 1202 is capable to perform calculations and configured to implement at least the predictor unit, and/or the trainer unit, or any corresponding unit/subunit(s)/integrated unit comprising at least both units, described herein, or at least part of functionalities/operations described above, for example by means of any of FIGS. 1 to 11 and any combination thereof, as a corresponding unit or a sub-unit if a distributed scenario is implemented, with corresponding algorithms 1203 stored in the memory 1204. The entity 1202 may include a processor, controller, control unit, microcontroller, unit, module, etc. suitable for carrying out embodiments or operations described above, for example by means of any of FIGS. 1 to 11 and any combination thereof. Generally the processor is a central processing unit, but the processor may be an additional operation processor.

A memory 1204 is usable for storing a computer program code required for the predictor unit, and/or the trainer unit, or any corresponding unit/subunit(s)/integrated unit comprising at least both units, or for one or more functionalities/operations described above, for example by means of any of FIGS. 1 to 11 and any combination thereof, i.e. the algorithms for implementing the functionality/operations described above by means of any of FIGS. 1 to 11 and any combination thereof. The memory 1204 may also be usable for storing one or more trained machine learning based models/algorithms, and other possible information, for example information associating events with weights and/or categories, and/or buffering incoming events.

The algorithms 1203 are software code, i.e. instructions, forming at least one portion of a computer program. The computer program may be in source code form, object code form, or in some intermediate form, and it may be stored in some sort of carrier, which may be any entity or device capable of carrying the program. For example, the computer program may be stored on a computer program distribution medium readable by a computing device or a processor. The computer program medium may be, for example but not limited to, an electrical carrier signal, software distribution package, or a non-transitory medium, for example. Coding of software for carrying out the embodiments as shown and described is well within the scope of a person of ordinary skill in the art.

As a summary, the predictor unit, and/or the trainer unit, or any corresponding unit/subunit(s)/integrated unit comprising at least both units and/or algorithms for functions/operations described herein, for example by means of means of any of FIGS. 1 to 11 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. The predictor unit, and/or the trainer unit, or any corresponding unit/subunit(s)/integrated unit comprising at least both units and/or algorithms for functions/operations described above, for example by means of means of any of FIGS. 1 to 11 and any combination thereof, may comprise one or more computer processors, application-specific integrated circuits (ASIC), digital signal processors (DSP), digital signal processing devices (DSPD), programmable logic devices (PLD), field-programmable gate arrays (FPGA), graphics processing units (GPU), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the predictor unit, and/or the trainer unit, or any corresponding unit/subunit(s)/integrated unit comprising at least both units or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of means of any of FIGS. 1 to 11 and any combination thereof, may be an element that comprises one or more arithmetic logic units, a number of special registers and control circuits.

It will be obvious to a person skilled in the art that, as technology advances, the inventive concept can be implemented in various ways. The invention and its embodiments are not limited to the examples described above but may vary within the scope of the claims.

What is claimed is:

1. A computer implemented method for remote condition monitoring of an electric power grid comprising intelligent electronic devices, the method comprising:
   receiving different events with time information from one or more intelligent electronic devices comprised in the electric power grid, an event being generated by a function in an intelligent electronic device as a reaction to one or more values measured from the electric power grid, the event indicating at least the function and its output, the event not comprising the one or more values measured from the electric power grid, wherein different functions generate events;
   inputting at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the disturbance event not being caused by a failure of an intelligent electronic device whose function generated the disturbance event, the trained predictor outputting predictions for occurrence times of disturbance events in the electric power grid;
   mapping the predictions for occurrence times of disturbance events, obtained based on the received events that were input to the model trained for the electric power grid, to probabilities of disturbance events in relation to time;
   generating, using the mapped probabilities, a report indicating as a function of time probability of any of the disturbance events to occur within at least two predetermined times of different length; and
   displaying the report for condition monitoring to be used for determining whether there is any evolving fault in the electric power grid, wherein an evolving fault has not yet resulted to an interruption in the electric power grid but will do so unless a maintenance action is triggered.

2. The computer implemented method of claim 1, wherein the generating the report comprises:
   generating two or more time windows of different lengths when determined from the same starting time; and
   indicating, per a time window to be displayed, whether an occurrence time of a disturbance event is within the time window, or within the next time window, or neither.

3. The computer implemented method of claim 1, further comprising:
   maintaining information associating events to event categories, wherein the information associates an event with one of the event categories;
   determining, before inputting the event, a category of the event; and
   inputting with the event also at least the category as input data to the trained predictor.

4. The computer implemented method of claim 1, further comprising:
   maintaining information associating events to weight values, wherein the information associates an event with one weight value;
   determining, before inputting the event, a weight value of the event; and
   inputting with the event also at least the weight value as input data to the trained predictor.

5. The computer implemented method of claim 1, further comprising:
   storing the events with time information at least temporarily;
   inputting with the event also at least the time information as input data to the trained predictor; and
   performing the inputting periodically.

6. A computer implemented method comprising:
   acquiring a plurality of event patterns extracted from event history data, or acquiring the event history data and extracting the plurality of event patterns from the history data, wherein the event history data comprises different events with time information from one or more intelligent electronic devices comprised in an electric power grid, an event being generated by a function amongst different functions in an intelligent electronic device as a reaction to one or more values measured from the electric power grid, the event indicating at least the function and its output, the event not comprising the one or more values measured from the electric power grid, and an event pattern comprising in occurrence order events preceding within a preset time span a disturbance event, which is an event resulting to an interruption in power supply in the electric power grid, the disturbance event not being caused by a failure of an intelligent electronic device whose function generated the disturbance event;
   inputting the plurality of event patterns as a training data to a machine learning model to train the model to predict occurrence times of disturbance events in the electric power grid based on events that are non-disturbance events; and storing the trained model to be used as a trained predictor for electric power grids for predictive condition monitoring of a power grid.

7. The computer implemented method of claim 6, wherein the machine learning model is a model outputting two or more time windows of different lengths, a length of a time window not exceeding the preset time span, the time windows predicting the occurrence times of disturbance events by being classified, per a time window, to one of three classes indicating, whether an occurrence time of a disturbance event is within the time window, or within the next time window, or neither.

8. The computer implemented method of claim 6, further comprising:

filtering, before inputting, from the plurality of event patterns, event patterns in which a disturbance event is generated by a function indicating testing or commissioning.

9. The computer implemented method of claim 6, wherein an event pattern comprises events generated by protective functions or control functions.

10. The computer implemented method of claim 6, further comprising:

acquiring information associating events to event categories, wherein the information associates an event with one of the event categories;

determining, per an event pattern, before inputting, a category of an event for events in the event pattern; and including event categories to be part of the event pattern as the training data.

11. The computer implemented method of claim 6, further comprising:

acquiring information associating events to weight values, wherein the information associates an event with one weight value;

determining, before inputting, per an event pattern, a weight value of an event in the event pattern; and including weight values to be part of the event pattern as the training data.

12. The computer implemented method of claim 11, further comprising:

filtering from the event pattern events having a weight value under a preset threshold.

13. An apparatus comprising at least:

a processor;

memory coupled with the processor; and computer program code stored in the memory and operable, when executed by the processor, to cause the apparatus at least to:

receive different events with time information from one or more intelligent electronic devices comprised in an electric power grid, an event being generated by a function in an intelligent electronic device as a reaction to one or more values measured from the electric power grid, the event indicating at least the function and its output, the event not comprising the one or more values measured from the electric power grid, wherein different functions generate events;

input at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the disturbance event not being caused by a failure of an intelligent electronic device whose function generated the disturbance event, the trained predictor outputting predictions for occurrence times of disturbance events in the electric power grid;

map the predictions for occurrence times of disturbance events, obtained based on the received events that were input to the model trained for the electric power grid, to probabilities of disturbance events in relation to time;

generate, using the mapped probabilities, a report indicating as a function of time probability of any of the disturbance events to occur within at least two predetermined times of different length; and display the report via a remote condition monitoring interface to be used for determining whether there is any evolving fault in the electric power grid, wherein an evolving fault has not yet resulted to an interruption in the electric power grid but will do so unless a maintenance action is triggered.

14. The apparatus of claim 13, wherein the at least one memory and computer program code are configured to, with the at least one processor, cause the apparatus further at least to perform the generating the report by:

generating two or more time windows of different lengths when determined from the same starting time; and indicating, per a time window to be displayed, whether an occurrence time of a disturbance event is within the time window, or within the next time window, or neither.

15. The apparatus of claim 13, wherein the at least one memory and computer program code are configured to, with the at least one processor, cause the apparatus further at least to:

maintain information associating events to event categories, wherein the information associates an event with one of the event categories;

determine, before inputting the event, a category of the event; and input with the event also at least the category as input data to the trained predictor.

16. The apparatus of claim 13, wherein the at least one memory and computer program code are configured to, with the at least one processor, cause the apparatus further at least to:

maintain information associating events to weight values, wherein the information associates an event with one weight value;

determine, before inputting the event, a weight value of the event; and input with the event also at least the weight value as input data to the trained predictor.

17. The apparatus of claim 13, wherein the at least one memory and computer program code are configured to, with the at least one processor, cause the apparatus further at least to:

store the events with time information at least temporarily;

input with the event also at least the time information as input data to the trained predictor; and perform inputting periodically.

18. An apparatus comprising at least:

a processor;

memory coupled with the processor; and computer program code stored in the memory and operable, when executed by the processor, to cause the apparatus at least to:

acquire a plurality of event patterns extracted from event history data, or acquire the event history data and extract the plurality of event patterns from the history data, wherein the event history data comprises different events with time information from one or more intelligent electronic devices comprised in an electric power grid, an event being generated by a function amongst different functions in an intelligent electronic device as a reaction to one or more values measured from the electric power grid, the event indicating at least the function and its output, the event not comprising the one or more values measured from the electric power grid, and an event pattern comprising in occurrence order events preceding within a preset time span a disturbance event, which is an event resulting to an interruption in power supply in the electric power grid, the disturbance event not being caused by a failure of an intelligent electronic device whose function generated the disturbance event;

input the plurality of event patterns as a training data to a machine learning model to train the model to predict occurrence times of disturbance events in the electric power grid based on events that are non-disturbance events; and store the trained model to be used as a trained predictor for electric power grids for predictive condition monitoring of a power grid.

19. The apparatus of claim 18, wherein the machine learning model is a model outputting two or more time windows of different lengths, a length of a time window not exceeding the preset time span, the time windows predicting the occurrence times of disturbance events by being classified, per a time window, to one of three classes indicating, whether an occurrence time of a disturbance event is within the time window, or within the next time window, or neither.

20. The apparatus of claim 18, wherein the at least one memory and computer program code are configured to, with the at least one processor, cause the apparatus further at least to:

filter, before inputting, from the plurality of event patterns, event patterns in which a disturbance event is generated by a function indicating testing or commissioning.

21. The apparatus of claim 18, wherein an event pattern comprises events generated by protective functions or control functions.

22. The apparatus of claim 18, wherein the at least one memory and computer program code are configured to, with the at least one processor, cause the apparatus further at least to:

acquire information associating events to event categories, wherein the information associates an event with one of the event categories;

determine, per an event pattern, before inputting, a category of an event for events in the event pattern; and include event categories to be part of the event pattern as the training data.

23. The apparatus of claim 18, wherein the at least one memory and computer program code are configured to, with the at least one processor, cause the apparatus further at least to:

acquire information associating events to weight values, wherein the information associates an event with one weight value;

determine, before inputting, per an event pattern, a weight value of an event in the event pattern; and include weight values to be part of the event pattern as the training data.

24. The apparatus of claim 23, wherein the at least one memory and computer program code are configured to, with the at least one processor, cause the apparatus further at least to filter from the event pattern events having a weight value under a preset threshold.

25. A non-transitory computer readable medium comprising program instructions for causing a computing apparatus to perform for remote condition monitoring of an electric power grid comprising intelligent electronic devices at least one of a first functionality or a second functionality, wherein the first functionality comprises at least:

when receiving different events with time information from one or more intelligent electronic devices comprised in the electric power grid, an event being generated by a function in an intelligent electronic device as a reaction to one or more values measured from the electric power grid, the event indicating at least the function and its output, the event not comprising the one or more values measured from the electric power grid, wherein different functions generate events, inputting at least the events as input data to a trained predictor, which is a machine learning based model that has been trained using at least a plurality of event patterns extracted from event history data, an event pattern comprising in occurrence order events preceding within a time span a disturbance event, which is an event resulting to an interruption in power supply in the electric power grid, the disturbance event not being caused by a failure of an intelligent electronic device whose function generated the disturbance event, the trained predictor outputting predictions for occurrence times of disturbance events in the electric power grid;

mapping the predictions for occurrence times of disturbance events, obtained based on the received events that were input to the model trained for the electric power grid, to probabilities of disturbance events elation to time;

generating, using the mapped probabilities, a report indicating as a function of time probability of any of the disturbance events to occur within at least two predetermined times of different length; and displaying the report for condition monitoring to be used for determining whether there is any evolving fault in the electric power grid, wherein an evolving fault has not yet resulted to an interruption in the electric power grid but will do so unless a maintenance action is triggered, wherein the second functionality comprises at least:

acquiring a plurality of event patterns extracted from event history data, or acquiring the event history data and extracting the plurality of event patterns from the history data, wherein the event history data comprises different events with time information from one or more intelligent electronic devices, an event being generated by a function amongst different functions in an intelligent electronic device as a reaction to one or more values measured from the electric power grid, the event indicating at least the function and its output, the event not comprising the one or more values measured from the electric power grid, and an event pattern comprising in occurrence order events preceding within a preset time span a disturbance event, which is an event resulting to an interruption in power supply in the electric power grid, the disturbance event not being caused by a failure of an intelligent electronic device whose function generated the disturbance event;

inputting the plurality of event patterns as a training data to a machine learning model to train the model to predict occurrence times of disturbance events in the electric power grid based on events that are non-disturbance events; and storing the trained model to be used as a trained predictor for electric power grids for predictive condition monitoring of an electric power grid.

\* \* \* \* \*